United States Patent Office 3,031,260
Patented Apr. 24, 1962

3,031,260
PROCESS FOR PREPARING MANGANESE
CARBONYL HYDRIDE
Oskar E. H. Klopfer, Clawson, Mich., assignor to Ethyl Corporation, New York City, N.Y., a corporation of Delaware
No Drawing. Filed Feb. 28, 1958, Ser. No. 718,116
7 Claims. (Cl. 23—14)

This invention relates to a novel process for the preparation of manganese carbonyl hydride.

It is an object of this invention to provide a process for the preparation of manganese carbonyl hydride. Further objects will be apparent from the ensuing description of the present invention.

It has now been discovered that manganese carbonyl hydride can be prepared by a straight-forward process which comprises reacting manganese pentacarbonyl with hydrogen at super-atmospheric pressure.

The reaction which is the subject of the present invention is conveniently carried out in a pressure resistant vessel having controlled heating means and means for charging and discharging liquid, solid and gaseous reaction products, as well as appropriate apparatus for the measurement of reaction conditions. The hydrogen pressures utilized in the process of this invention vary from about 300 to about 5000 p.s.i., however, pressures in the range of from 500 p.s.i. to about 2000 p.s.i. are preferred as they are easily attained in available equipment and have been found to lead to a high yield of the desired manganese carbonyl hydride.

The temperatures employed in conducting the process of this invention range from about 50 to about 250° C. Temperatures in the range of about 100 to 200° C. are preferred as high yields of manganese carbonyl hydride are obtained by their use.

The reaction of manganese carbonyl with hydrogen under pressure at the above conditions of temperature and pressure can be conducted for from a few minutes to as long as 10 hours or longer. Preferred conditions lead to excellent yields of manganese carbonyl hydride are from about 30 minutes to about 4 hours.

Since manganese carbonyl, which is a reactant of the process of this invention, tends to undergo thermal decomposition at the elevated temperatures sometimes employed, it is preferred to retard this decomposition by maintaining the reaction mixture under carbon monoxide pressure. In particular, when the process of this invention is conducted at above 200° C., up to 1 part of carbon monoxide is profitably employed for each part of hydrogen in the reaction vessel. However, the preferred carbon monoxide to hydrogen ratios are up to 1:3.

When the heating period has been completed, the pressure resistant vessel in which the reaction is conducted should be cooled before the resulting gasses are vented. Venting is conveniently carried out through a plurality of cold traps cooled to the temperature of Dry Ice, whereupon the desired manganese carbonyl hydride condenses in the cold traps and may be recovered therefrom. To completely recover the manganese carbonyl hydride from the reaction mixture, it is frequently convenient to purge the mixture with an inert gas to carry over the volatile manganese carbonyl hydride. Thus, after completion of the reaction and venting of the resulting gases, nitrogen can be bubbled through the reaction residue and additional manganese carbonyl hydride recovered from the cold traps.

The manganese carbonyl hydride product can also be recovered by several other methods. When the carrier for the manganese carbonyl reactant is miscible with water, the manganese carbonyl hydride product may be caused to separate therefrom by the addition of water to the reaction mixture after which the manganese carbonyl hydride can be separated by simple decantation of the aqueous phase or solution of the product into a water immiscible solvent such as ether or a hydrocarbon. Manganese carbonyl hydride may also be separated from the reaction mixture by vacuum distillation using a reflux condenser to prevent distillation of the solvent employed. Furthermore, when the solvent or carrier employed is a liquid at the temperature of Dry Ice, the reaction mixture may be cooled causing the manganese carbonyl hydride to precipitate as a separate phase. It is also frequently unnecessary to recover the manganese carbonyl hydride in its pure state as it may conveniently be employed in the reaction solvent for further synthesis or additive use.

The manganese carbonyl hydride which is a product of this invention is a nearly colorless liquid at room temperature and has a melting point in the range of $-20°$ C. The compound boils at about 50° C. It is useful as an antiknock agent when added to gasoline and it is also a valuable intermediate in the preparation of organomanganese carbonyl compounds.

In conducting the process of this invention, it is often desirable to employ an inert liquid carrier for the manganese carbonyl reactant. Such carriers include refined white mineral oil, other saturated hydrocarbon compounds, aromatic hydrocarbons, ethers, and more complex compounds which are inert to the reactants such as silicon oils and diesters. Examples of suitable carriers include isooctane, hexane, benzene, n-nonane, and decane and the various isodecanes and other paraffinic hydrocarbons having up to about 20 carbon atoms such as eicosane, octadecane, pentadecane and the like. Ether solvents which may be employed include ethyl ether, propyl ether, butyl ether, amyl ether, ethyl octyl ether, amyl ethyl ether, ethyl heptyl ether, ethyl hexyl ether, and the like. Ester solvents which may be employed include pentyl 2-methyl-propanoate, pentyl butanoate, butyl butanoate, γ-methylbutyl butanoate, ethyl decanoate, methyl decanoate, pentyl hexanoate, ethyl hexanoate, and the like. Applicable silicone oils include copolymers and homopolymers of the various organosiloxanes and organosilanes having the appropriate boiling range. Examples of these are the dimethyl polysiloxanes, methylphenyl, polysiloxanes, diphenyl polysiloxanes, di(chlorophenyl)polysiloxanes, hexaethyldisiloxane, hexapropyl disilane, diethyldipropyldiphenyldisilane and the like. The polyesters applicable as solvents in the process of this invention are completely esterified dicarboxylic acids. Esters may be employed derived from succinic, maleic, pyrotartaric, glutaric, adipic, pimelic, suberic, azelaic, sebacic and pinie acids, specific esters being di(1-methyl-4-ethyloctyl)glutarate, di(2-ethylhexyl)adipate, di(3-methylbutyl)azelate, di(2-ethylhexyl)azelate, di(2-ethylhexyl)-sebacate, di(3,5,5-trimethylhexyl)sebacate, di(2-ethylhexyl)maleate, di(methylcyclohexyl)adipate, 2-ethylhexyl-1-methylheptyl sebacate, and the like.

Manganese carbonyl used as a reactant in the process of this invention is readily prepared by reacting manganous chloride with an aryl Grignard reagent, such as phenyl magnesium bromide or phenyl magnesium chloride, under a pressure of carbon monoxide. In this process, the Grignard reagent and the anhydrous manganous chloride are mixed in excess ether at about −50° C. and carbon monoxide is introduced into the pressure reaction vessel at a pressure ranging from 300 p.s.i.g. to 2200 p.s.i.g., the temperature of the reaction mass is then elevated. The reaction mixture is constantly agitated throughout the reaction period. The manganese carbonyl is readily separated from the product mixture by conventional methods, such as fractional distillation, sublimation and steam distillation. This process is completely illustrated in Patent 2,822,247.

The process of this invention is further illustrated by the following examples in which all parts and percentages are by weight.

Example I

One hundred ninety-five parts of manganese carbonyl were dispersed in 7500 parts of white mineral oil and charged to a pressure resistant vessel having heating and cooling means, means for measuring temperature and pressure and means for charging and discharging liquid, solid and gaseous reactants. The pressure resistant vessel was sealed and pressured at room temperature with hydrogen to 1800 p.s.i. The temperature was then raised to 200° C., which temperature was maintained for two and one-half hours. The vessel was then cooled and the gases were then vented through traps cooled to the temperature of Dry Ice. Manganese carbonyl hydride collected in the cold traps as a white solid which on warming to room temperature, became an almost colorless, pale yellow liquid. The infrared spectra of this compound confirms the assigned structure.

Example II

The procedure of Example I is followed except that toluene is used as a carrier for the manganese carbonyl. The total reaction pressure is 600 p.s.i. at 250° C. One-half of the pressure is due to added carbon monoxide, thus the hydrogen pressure is 300 p.s.i., and the carbon monoxide pressure is 300 p.s.i. Reaction conditions are maintained for ten hours. An excellent yield of manganese carbonyl hydride results.

Example III

In this example, the manganese carbonyl is carried in an excess of tetrahydrofuran and the hydrogen pressure is 5000 p.s.i. An additional 500 p.s.i. of carbon monoxide is employed. The reaction time is four hours and results in a good yield of manganese carbonyl hydride.

Example IV

The general procedure of Example I is followed. The reaction temperature is 100° C. at a hydrogen pressure of 2000 p.s.i. Ethyl propionate is employed as the carrier. The reaction vessel is maintained at the reaction conditions for five hours, after which time an excellent yield of manganese carbonyl hydride is recovered.

Example V

The manganese carbonyl is dispersed in cyclohexane as a carrier and a total operating pressure of about 670 p.s.i. is employed, one-quarter of which is contributed to carbon monoxide, the balance being hydrogen pressure. The reaction temperature is 150° C. which is maintained for three and one-half hours. Manganese carbonyl hydride is recovered according to the procedure outlined in Example I.

Example VI

The general procedure of Example I is followed employing about 200 parts of manganese carbonyl in 5000 parts of dioxane. The reaction is conducted at 50° C. for about 5 hours and leads to a good yield of manganese carbonyl hydride.

Example VII

The procedure of Example I is followed employing a reaction temperature of 175° C. which is maintained for 30 minutes. Ethyl ether is used as the carrier for manganese carbonyl reactant. The total pressure of the operating temperature is 1200 p.s.i. of which 200 p.s.i. is carbon monoxide pressure and 1000 is due to hydrogen. The resulting manganese carbonyl hydride is not isolated from the reaction mixture but is used to directly prepare chloromanganese pentacarbonyl by the reaction with excess carbon tetrachloride. The carbon tetrachloride is added with agitation and shortly thereafter a solid precipitates which is identified as chloromanganese pentacarbonyl by comparison of the infrared spectra with a spectra obtained from a known sample of this compound.

Example VII illustrates the direct use of manganese carbonyl hydride prepared by the process of this invention in further synthesis of manganese carbonyl-containing compounds. Further illustrations of this use are provided in the following examples.

Example VIII

A portion of manganese carbonyl hydride prepared by the process of Example I was dissolved in carbon tetrachloride in −20° C. to yield a nearly colorless solution. Upon warming the solution, pale yellow crystals precipitated. The crystals were analyzed by infrared spectroscopy and were shown to be chloromanganese pentacarbonyl.

Example IX

To illustrate the usefulness of the chloromanganese pentacarbonyl prepared from manganese carbonyl hydride which is made by the process of this invention, cyclopentadienyl manganese tricarbonyl, a valuable antiknock agent, is prepared from cyclopentadienyl sodium and chloromanganese pentacarbonyl. The procedure is as follows: Cyclopentadientyl sodium is prepared by reacting cyclopentadiene with sodium dispersed in tetrahydrofuran. The solution is then added slowly to a tetrahydrofuran solution containing chloromanganese pentacarbonyl with agitation. A finely divided solid is formed and carbon monoxide is slowly evolved. When the reaction is complete, the solvent is removed under reduced pressure and the residue sublimed at about 70° C. at a pressure of less than 1 millimeter of mercury. The product is found to contain a good yield of cyclopentadienyl manganese tricarbonyl which can be identified by comparison of the infrared spectra with that of an authentic sample of the compound. The use of cyclopentadienyl manganese tricarbonyl and related compounds is fully described in U.S. Patent 2,818,417.

I claim:
1. Process for the preparation of manganese pentacarbonyl hydride which comprises reacting manganese pentacarbonyl with hydrogen under a hydrogen pressure ranging from 300 to 5,000 p.s.i. and a temperature ranging from about 50° C. to about 250° C.

2. Process of claim 1 wherein the manganese carbonyl reactant is suspended in an inert carrier.

3. The process of claim 1 in which the hydrogen pressure ranges from about 500 p.s.i. to about 2,000 p.s.i.

4. The process of claim 3 wherein the process temperature ranges from about 100 to about 200° C.

5. Process for the preparation of manganese carbonyl hydride which comprises reacting manganese pentacarbonyl with hydrogen in the presence of carbon monoxide wherein the hydrogen pressure is from 300 to 5000 p.s.i. and the temperature is from 50° C. to about 250° C., the carbon monoxide being present in amount such that the ratio of carbon monoxide to hydrogen does not exceed 1:1.

6. The process of claim 5 in which the hydrogen pressure ranges from about 500 p.s.i. to about 2,000 p.s.i. and the temperature ranges from about 100 to about 200° C.

7. The process of claim 5 in which the temperature employed in the process is above 200° C. and the ratio of carbon monoxide to hydrogen is about 1:1.

References Cited in the file of this patent
UNITED STATES PATENTS 2,767,048 Mertzweiller _____ Oct. 16, 1956

OTHER REFERENCES

P. Pino: "Sintesi di aldeidi a temperatura ambiente per reazione fra olefine dicobalto-ottacarbonile e idrogeno," La Chimica e l'Industria, vol. 37, October 1955, pp. 782–786.

Ephraim et al.: Inorganic Chemistry, Nordeman Publ. Co., Inc., New York, N.Y., 4th edition, 1943, p. 795.